United States Patent
Wiedemer

[11] Patent Number: 5,781,384
[45] Date of Patent: Jul. 14, 1998

[54] RESETTABLE SINGLE PLAY TAPE CASSETTE

[76] Inventor: John David Wiedemer, 930 W. Forest Dr., Houston, Tex. 77079

[21] Appl. No.: 510,245

[22] Filed: Aug. 2, 1995

Related U.S. Application Data

[60] Division of Ser. No. 175,165, Dec. 29, 1993, Pat. No. 5,473,688, which is a continuation-in-part of Ser. No. 900,230, Jun. 17, 1992, abandoned.

[51] Int. Cl.$^6$ .................... G11B 23/087; G11B 23/28
[52] U.S. Cl. .................... 360/132; 360/137; 242/343
[58] Field of Search .................... 360/132, 137; 242/338.1, 343, 343.1, 343.2

[56] References Cited

U.S. PATENT DOCUMENTS

| | | | |
|---|---|---|---|
| 4,466,584 | 8/1984 | Chevalier et al. | 360/132 |
| 4,475,222 | 10/1984 | Egendorf | 360/132 |
| 4,554,443 | 11/1985 | Lambert et al. | 360/132 |
| 4,586,099 | 4/1986 | Suzuki et al. | 360/132 |
| 4,593,337 | 6/1986 | Leone et al. | 360/132 |
| 4,660,115 | 4/1987 | Westfall et al. | 360/132 |
| 4,671,479 | 6/1987 | Ikebe et al. | 360/132 |
| 4,763,218 | 8/1988 | Westfall et al. | 360/132 |
| 4,802,048 | 1/1989 | Perkins et al. | 360/132 |
| 4,842,217 | 6/1989 | Vinson | 360/132 |
| 4,905,112 | 2/1990 | Rhodes | 360/132 |
| 5,005,099 | 4/1991 | Perryman et al. | 360/132 |
| 5,228,637 | 7/1993 | Granzotto | 360/132 |

*Primary Examiner*—Craig A. Renner
*Attorney, Agent, or Firm*—Quarles & Brady

[57] ABSTRACT

A tape cassette or the like employs a resettable counter that disables the playing of the cassette after a limited number of playings consistent with home use. The small number of playings is supported by a machine resetting procedure that automatically records the usage and resets the cassette by translating information on a label on the cassette into a sequence of moves that unlocks the resetting mechanism that is otherwise locked against unauthorized parties. The label also includes a machine readable description of the program. Cassettes with the same program material have different reset codes on their labels to limit the resetting of some cassettes to particular machines thus lessening the economic incentive of obtaining or constructing unauthorized resetting equipment.

5 Claims, 8 Drawing Sheets

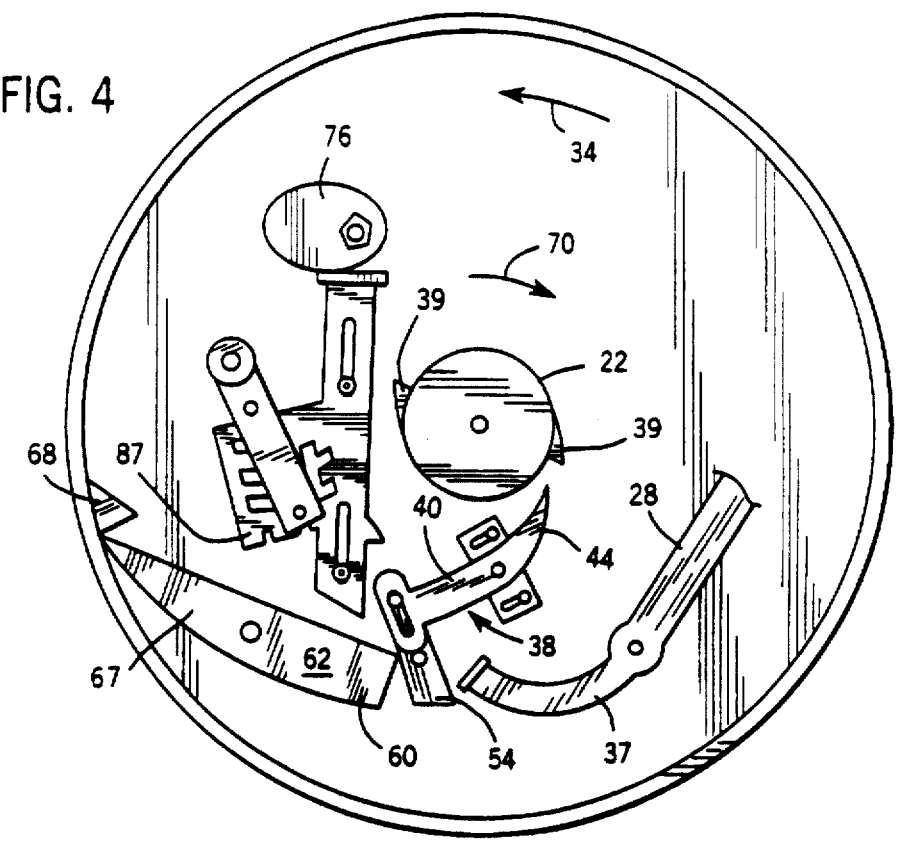
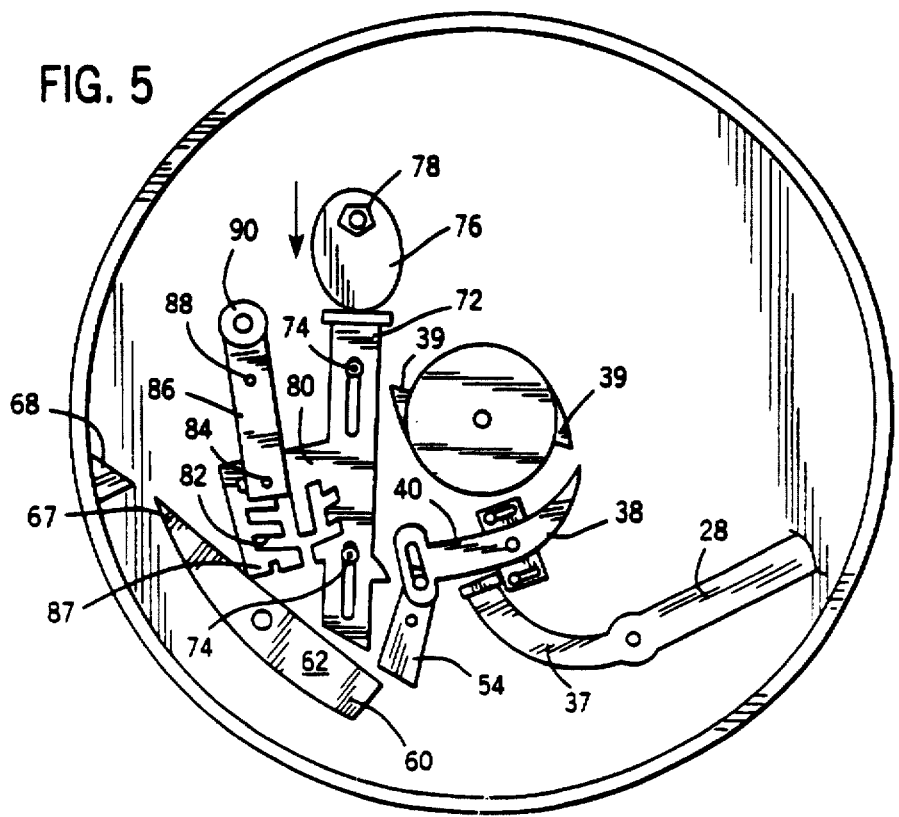

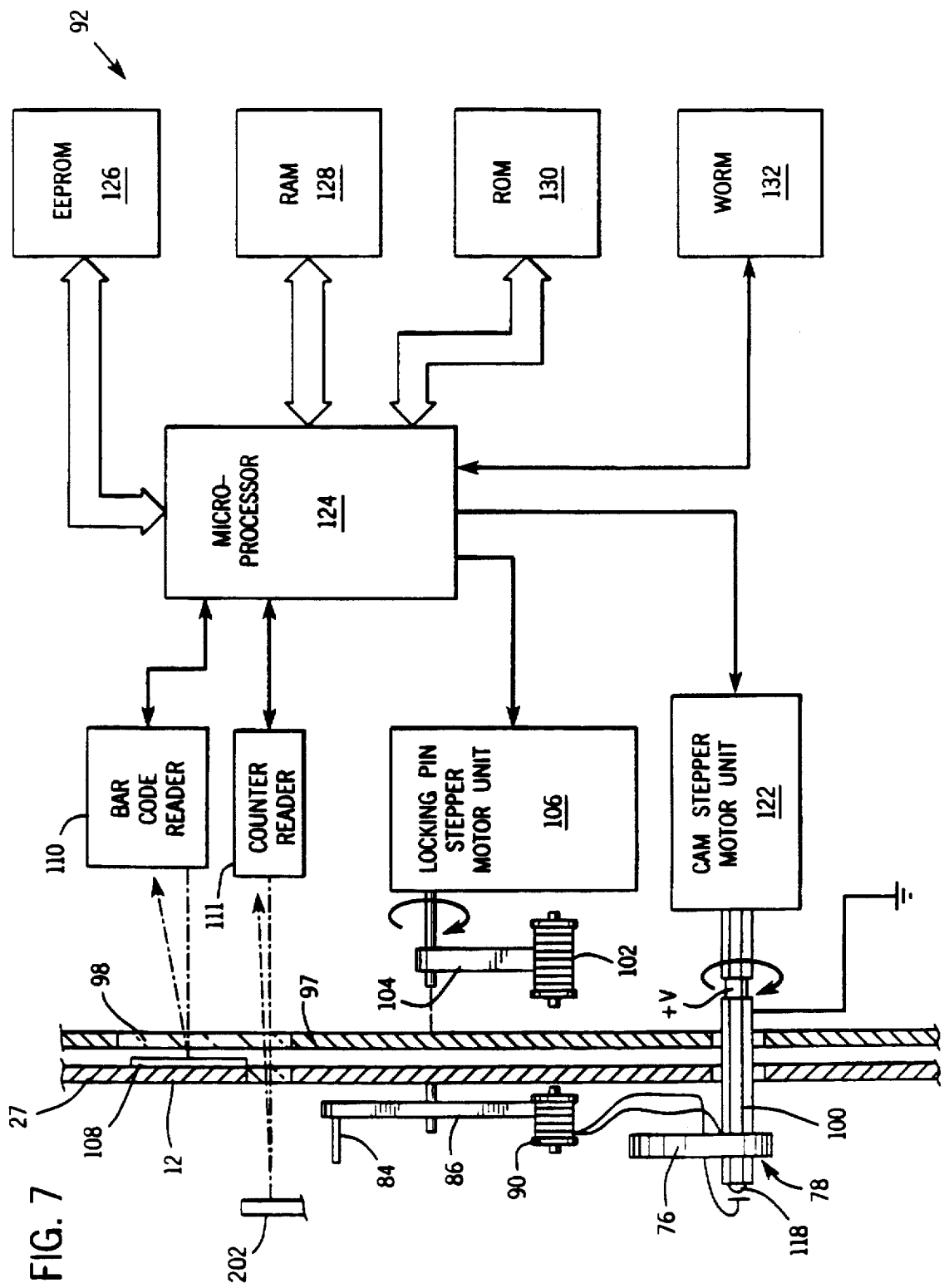

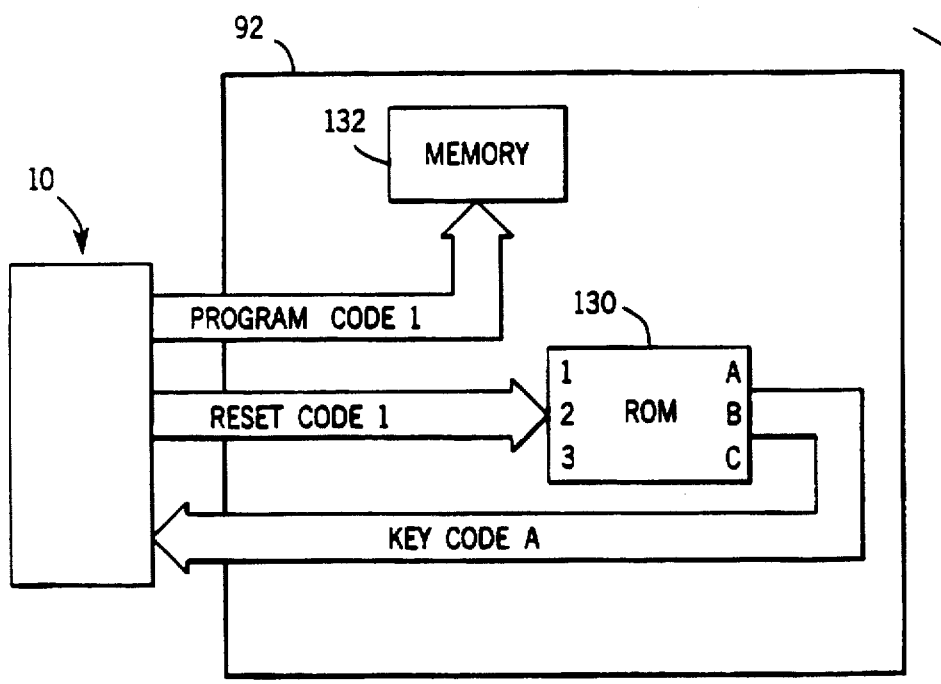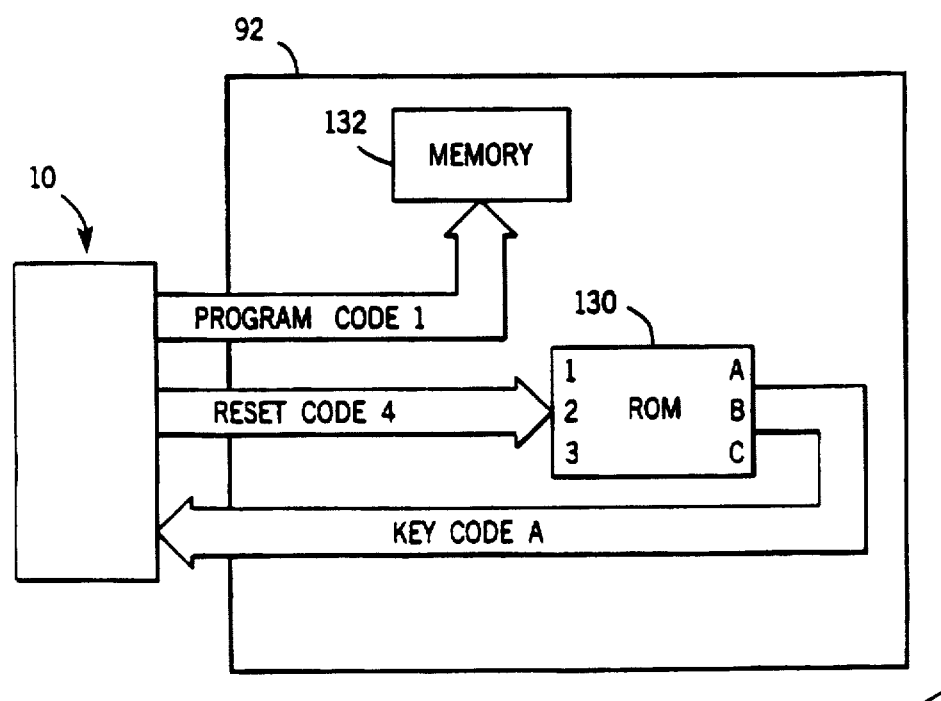
FIG. 13

5,781,384

RESETTABLE SINGLE PLAY TAPE CASSETTE

This is a division of application Ser. No. 08/175,165, filed Dec. 29, 1993, now U.S. Pat. No. 5,473,688, issued Dec. 5, 1995, which is a continuation-in-part of Ser. No. 07/900,230 filed Jun. 17, 1992, now abandoned.

BACKGROUND OF THE INVENTION

This invention relates generally to magnetic tape cassettes, such as are used for recording video information, and more particularly to a system for reliably controlling and auditing the number of times the tape cassette is played.

Motion pictures are generally distributed to theaters which operate on a pay-per-view system, that is, members of the public are charged a fixed ticket price for each viewing of the film. Additional viewing of the film requires the purchase of additional tickets and the paying of additional fees.

A pay-per-view system is desirable because it allows a degree of economic price differentiation distinguishing between heavy and light demand for the product, maximizing the revenues obtained for the motion picture property and efficiently allocating costs among consumers. Pay-per-view pricing benefits consumers, both because it tends to decrease the cost of the first viewing, reducing the risk to all consumer of viewing an unknown motion picture and indirectly because it encourages the production of motion pictures (especially those of a quality which may be expected to receive multiple viewings).

The introduction of inexpensive, home video tape players, using magnetic tape stored in a cassette, has fundamentally changed the economics of how motion pictures are viewed and distributed. With the advent of the personal video tape recorder, a motion picture rental industry has been created in which the motion pictures are copied onto video tape cassettes and rented for home viewing. Presently within this rental industry, the ability to enforce a pay-per-view pricing structure has largely disappeared.

The inability of the motion picture industry to implement pay-per-view pricing in the rental industry requires that they sell the motion picture at a higher single price which in some way is an average of the expected viewings of each copy. Clearly, the infrequent viewer who purchases a tape and does not lend it out is unfairly penalized in this arrangement. Perhaps less clear, however, is that this arrangement is not ideal from the point of view of the rental companies who must purchase the motion picture at a price based on this before the fact estimate regardless of the actual demand for the motion picture which may be much less than the estimate. The cost associated with incorrectly estimating the rental demand of a motion picture could be efficiently shared by charging a pay-per-view basis.

Various means have been tried for approximating the benefits of pay-per-view pricing in the motion picture rental industry. Some methods destroy the tape, either physically or by erasing it, as the tape is viewed. These systems increase the cost of renting to impractical levels by requiring either new cassettes or re-recording of the old cassettes. Other methods employ counters that tally the number of viewings and then lock the cassette from further play. These methods also contemplate disposal of the cassette at the end of the range of the counter thus also increasing the cost of the system.

A variation of the above described cassettes having a counter are cassettes that include both a counter and a means for resetting of the counter when the counter reaches its limit. The resetting mechanism must be locked to prevent tampering or else it would be of little value, yet constructing such a locked resetting means is difficult. The lock must be reliable and inexpensive to be practical, and not unduly burdensome to the consumer and retailer. And the lock must secure in the face of the significant incentive to develop an unauthorized "master key", to permit unaudited viewings of cassettes. Such incentives will rise for any auditing system that becomes an industry standard. A casual locking systems will probably not be effective for its intended purpose of deterring unaudited viewings of the material on cassettes.

In order to reduce the cost of disposable cassettes with counters, the counter is typically given large range (e.g. 999). This eliminates the need to prematurely retire the cassette or to provide secure resetting capability but may detrimentally increase the benefit of simply stealing the cassette or fraudulently reporting its loss.

Frequently pay-per-view systems do not meet the joint concerns of the movie producers and the consumer who may want a no charge free preview period and considerable freedom in reviewing sections of the cassette during play without charging more than once or who may, as a practical matter, insist on the freedom to replay the cassette for a limited number of times consistent with home viewing.

SUMMARY OF THE INVENTION

The present invention provides an apparatus and method for providing near pay-per-view viewing of cassettes in a manner consistent with developing consumer expectations and in a manner that reduces incentives to defeat pay-per-view auditing. The invention first facilitates the use of cassettes that provide a small number of replayings before they lock-up. Thus, the invention allows casual replaying demanded by consumers without unduly encouraging theft of the cassette which still has limited potential playings. Second, the invention links the codes used to reset the cassettes to particular resetting units to limit the incentive to defeat or reverse engineer any one resetting unit.

Specifically, the invention provides an auditing mechanism for cassettes that count playings and locks-up after a low predetermined number of playings subject to resetting according to a key code. The auditing mechanism includes a label reader for reading a label on the cassette, the latter which provides a reset code and a program code. The program code indicates the contents of the cassette, e.g., a movie title. A counter reader reads the cassette's counter to provide a count number. This count number and the program code are stored in an electronic memory within the auditing mechanism. The reset code is translated by a decoding circuit to provide the necessary resetting of the cassette through a reset means.

Thus, as mentioned above, it is one object of the invention to permit a consumer to replay a cassette a few times and yet to prevent a large number of replays that would unduly encourage appropriation of the cassette itself. This limited replaying is made practical by an automatic resetting of the cassette which is securely accomplished through a key code derived from a label on the cassette itself. The limited replaying enhances the security of the key codes by limiting the benefit of defeating the key code system. Thus the limited playing and coded resetting operate in synergy.

The cassette which has a disabling means for preventing its playing when set but for allowing playing of the cassette when reset and a reset means for moving to reset the disable means, may be locked through a lock mechanism that prevents movement of the reset means when locked and hence unauthorized resetting of the cassette. The lock may include a pin and a maze, the latter attached to the reset means and having a serpentine channel for receiving the pin and allowing movement of the reset means only when the pin is successfully negotiated through the maze. A linkage attached to the pin permits moving of the pin through the maze to permit resetting of the disable means.

Thus, it is another object of the invention to provide a combination-type lock for locking the resetting means that offers a number of combinations that may be used for different cassettes.

Labels affixed to the cassettes may hold program information and reset codes which may be used to determine the key code necessary to unlock the cassettes. Labels with the same program codes, thus generally holding the same recorded materials, may have different reset codes. A first label may be affixed to a first cassette having a first program data and a first reset code, whereas a second label may be affixed to a second cassette having the first program data but a second reset code. A first resetting machine may be programmed so that it may translate the first resetting code to reset the first cassette but may not translate the second reset code to reset the second cassette. A second cassette resetting machine may be programmed with data so that it may translate the second reset code to reset the second cassette but may not translate the first reset code to reset the first cassette.

Thus, the invention contemplates partitioning of reset codes among reset machines thereby preventing cassettes from being reset on more than a limited subset of the available resetting machines. This substantially restricts the benefits to be derived from reverse engineering either the key codes or the resetting machines.

The first and second reset codes may in fact translate to a single key code.

Thus it is yet another object of the invention to eliminate the need to provide costly variation in the actual mechanics of the unlocking mechanism.

Other objects, features and advantages will become apparent from the following specification when taken in conjunction with the accompanying drawings.

BRIEF DESCRIPTION OF THE DRAWINGS

FIG. 4 is a view similar to that of FIG. 2 showing the mechanism after exhaustion of the replay limit, per FIG. 3, and upon the start of rewinding;

FIG. 5 is a view similar to FIG. 4 showing the resetting of the mechanism after the rewinding of FIG. 4;

FIG. 7 is a block diagram showing the elements of the resetting mechanism in conjunction with their corresponding elements of the tape cassette as shown in FIG. 1;

FIG. 13 is a block diagram showing the exclusive subsets of the reset codes that may be used to prevent a given resetting machine from having broad resetting capabilities yet reducing eh variety of actual hardware locks required.

DESCRIPTION OF THE PREFERRED EMBODIMENT

Figure 1:
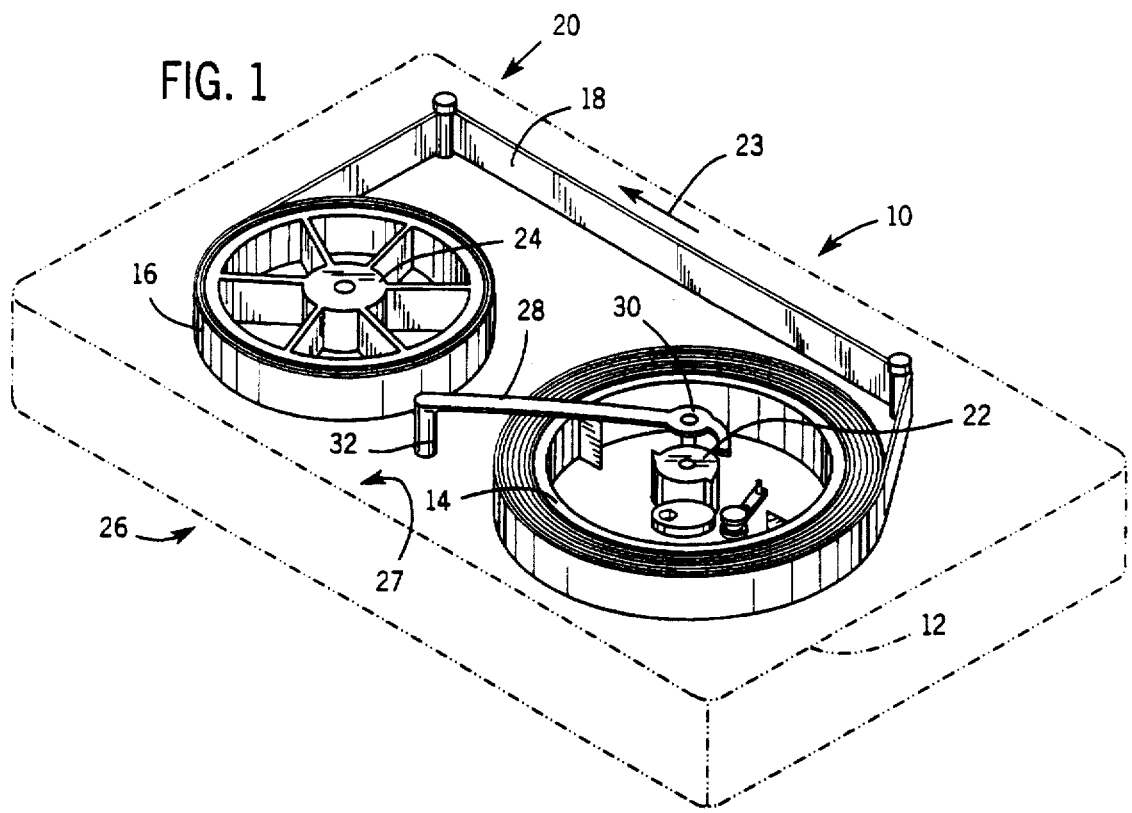
FIG. 1 is a perspective view of a cassette employed in the present invention with the cassette housing in phantom to show the supply and take-up reel as positioned when the consumer first receives the tape cassette.

Referring to FIG. 1, a tape cassette 10, such as is used in conjunction with the VHS videotape recording standard, includes a generally rectangular cassette housing 12 holding a supply reel 14 and take-up reel 16 therein. Prior to first playing the cassette 10, and as shown in FIG. 1, the supply reel 14 is fully wound with a flexible magnetic tape 18. The magnetic tape 18 passes from the supply reel 14 along a front edge 20 of the housing 12 and then is received by the take-up reel 16. During a playing of the tape cassette 10, the magnetic tape 18 moves from the supply reel 14 to the take-up reel 16 as indicated by arrow 23.

The supply reel 14 and take-up reel 16 include hubs 22 and 24 respectively, having splined bores (not shown) exposed through openings in the bottom face 26 of the tape cassette 10. The splined bores of the hubs 22 and 24 are received by corresponding engaging shafts (not shown) of a tape player so as to rotate the hubs 22 and 24, and thus the supply reel 14 and the take-up reel 16, to move the magnetic tape 18 from the supply reel 14 to the take-up reel 16 during play.

A tape follower arm 28 swings about pivot 30 attached to the top face 27 of the housing 12 so that a pad 32, attached to the arm 28 at a position removed from the pivot 30 toward the take-up reel 16, may swing in a generally radial direction towards the hub 24 of the take-up reel 16 so as to rest on the outer surface of the magnetic tape 18 as wound around the take-up reel 16. Thus, as magnetic tape 18 moves from the supply reel 14 to the take-up reel 16, the tape follower arm 28 rotates counterclockwise in FIG. 1, about pivot 30, to provide an indication of the amount of tape played, as will be described below.

Figure 2:
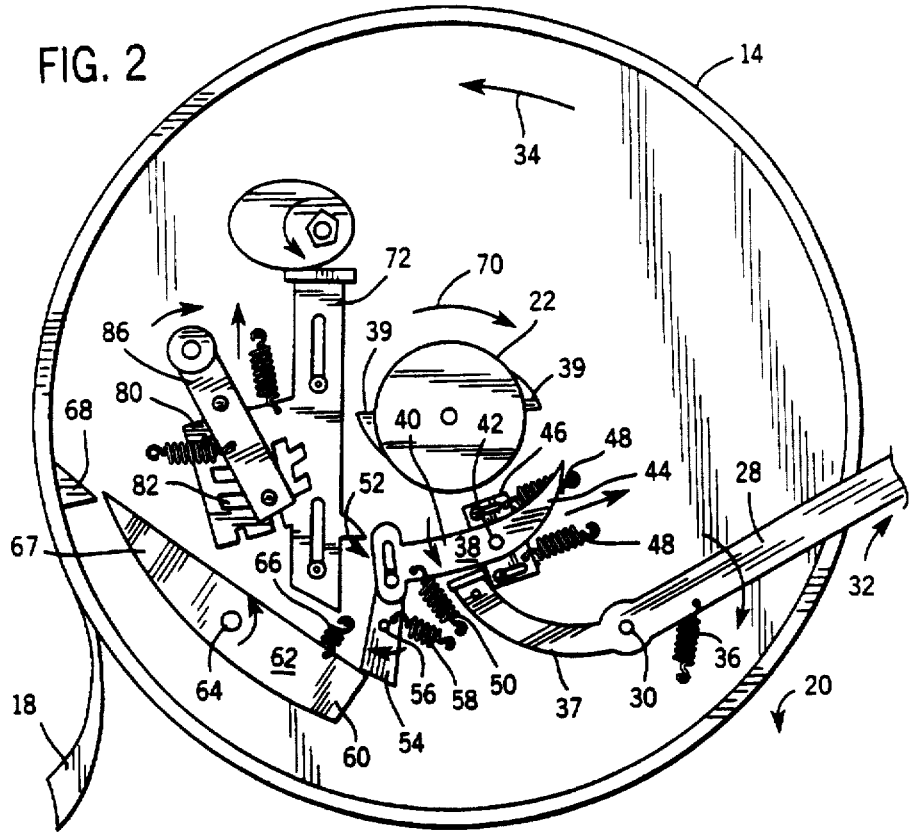
FIG. 2 is a plan view of an embodiment of a mechanism according to the present invention, also showing the mechanism as positioned when the consumer first receives the tape cassette.

Referring now to FIG. 2, and observing the convention that the supply reel 14 is being viewed from the top with the front edge 20 of the tape cassette 10 towards the bottom of the figure, as shown in FIGS. 2–5, the supply reel 14 rotates in a counterclockwise direction 34 during a playing of the magnetic tape 18.

The tape follower arm 28 is urged by a spring 36 in a clockwise direction about a pivot 30. Thus, as described above, during the playing of the cassette 10, the spring 36 presses the pad 32 (shown in FIG. 1) against the outer circumference of the magnetic tape 18 on the tape reel 16.

A finger 37 extending from the tape follower arm 28 in the opposite direction from the pad 32 abuts a lever portion 40 of a reverse pawl 38. The operation of the finger 37 will be described further below.

The lever portion 40 of the reverse pawl 38 connects to a toothed portion 44 of the reverse pawl, about a pivot 42, so that both swing in unison about the pivot 42. A spring 50 pulls the lever portion 40 of the reverse pawl 38 in a radial outward direction with respect to the hub 22, thus also moving the toothed portion 44 generally inward toward hub 22.

The pivot 42 is further mounted on a slide block 46 which is biased by springs 48 to move the slide block 46 generally along a tangent to the rotation of the hub 22 in a counterclockwise direction.

The Replay Limit

During the initial playing of the cassette 10, the slide block 46 is positioned fully to the left along the counterclockwise tangent and the reverse pawl 38 is held in position, against the counterclockwise bias of the spring 50, by the finger 37 of the tape follower arm 28, which abuts the lever portion 40 of the reverse pawl 38 on its outer side with respect to the hub 22. The toothed portion 44 of the reverse pawl 38 is thereby retracted from and does not engage a series of ratchet teeth 39 on the hub 22.

The lever portion 40 of the reverse pawl 38 is also connected, by means of a sliding hinge 52, to one end of a release lever 54. The release lever 54 swings about centrally located pivot 56 which bisects the length of a release lever 54. Initially, the release lever 54 is positioned along a substantially radial line from hub 22, with its radially proximate end connected by the sliding hinge 52 to the lever portion 40 of the reverse pawl 38. A spring 58 provides a general clockwise bias to the release lever 54, such bias being resisted, during the initial playing of the tape cassette 10, by the sliding hinge 52 bearing against the reverse pawl 38.

The radially outward end of the release lever 54 abuts a lever portion 60 of a play pawl 62. The play pawl 62 is generally biased in a counterclockwise direction around a pivot 64 by a spring 66, with the radially outward end of release lever 54 abutting the lever portion 60 of the play pawl 62, thereby preventing the counterclockwise rotation of the play pawl 62.

Opposite the pivot 64 from the lever portion 60 of the play pawl 62 is a toothed portion 67. As blocked by release lever 54, the toothed portion 67 of the play pawl 62 is held away from ratchet teeth 68, the ratchet teeth facing inward from the circumference of the supply reel 14. Thus, during an initial playing of the tape cassette 10, prior to reaching a replay limit, the supply reel 14 is free to move in either the counterclockwise play direction 34, or a clockwise rewind direction 70.

Referring to FIGS. 1 and 2, as magnetic tape 18 moves from the supply reel 14 to the take-up reel 16, the tape follower arm 28 will be moved in a counterclockwise direction about pivot 30 lowering the finger 37 and allowing the reverse pawl 38 to rotate in a counterclockwise direction. This counterclockwise rotation brings the toothed portion 44 progressively closer to engaging ratchet teeth 39 on hub 22 as the tape cassette 10 is played. When sufficient tape has moved from the supply reel 14 to the take-up reel 16, the tape follower arm 28 will have rotated sufficiently in the counterclockwise direction to allow the toothed portion 44 to engage ratchet teeth 39.

The amount of magnetic tape 18 which must move to the take-up reel 16, before reverse pawl 38 can engage ratchet teeth 39, defines the replay limit prior to which the user of the tape may play and reverse the tape without restriction. As will be understood by those of ordinary skill in the art, the length of playing prior to the replay limit may be readily adjusted, for example, by changing the angle between the tape follower arm 28 and the finger 37 or the length of the finger 37. Prior to the passing the replay limit, the cassette 10 may be played and rewound without restriction.

The Free Preview Period

Figure 9:
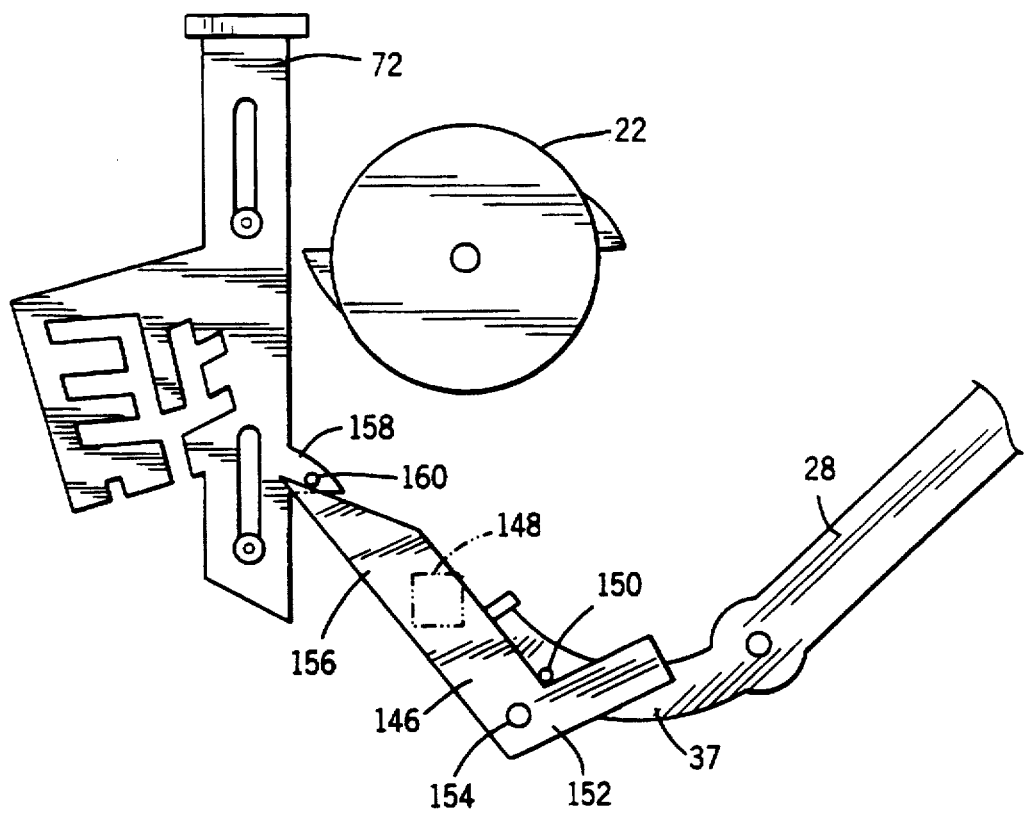
FIGS. 9 and 10 are details of the mechanism of FIG. 2 showing the placement and operation of the indicator flag indicating playing of the cassette of FIG. 1

Referring to FIG. 9, in one embodiment, the passage of a free preview period prior to the replay limit may be indicated to user by flag lever 146, which moves in front of or away from a window 148 in housing 12 of the cassette 10. The flag lever 146 is actuated by a pin 150 on the upper surface of the finger 37 of the tape follower arm 28. As the finger 37 moves downward, it engages a handle portion 152 of the flag lever 146, thus rotating the flag lever 146 clockwise about pivot 154, to swing a flag portion 156 of the flag lever 146 in front of the window 148. The flag portion 156 may be painted red to provide a contrast to the typically black housing 12 of the tape cassette 10. The flag lever 146 is biased by an over center spring (not shown), such as is known in the art, to hold the flag portion 146 in front of the window 148 even when the tape is rewound, and the pin 150 is no longer pressing on the handle portion 152 of the flag lever 146.

Figure 10:
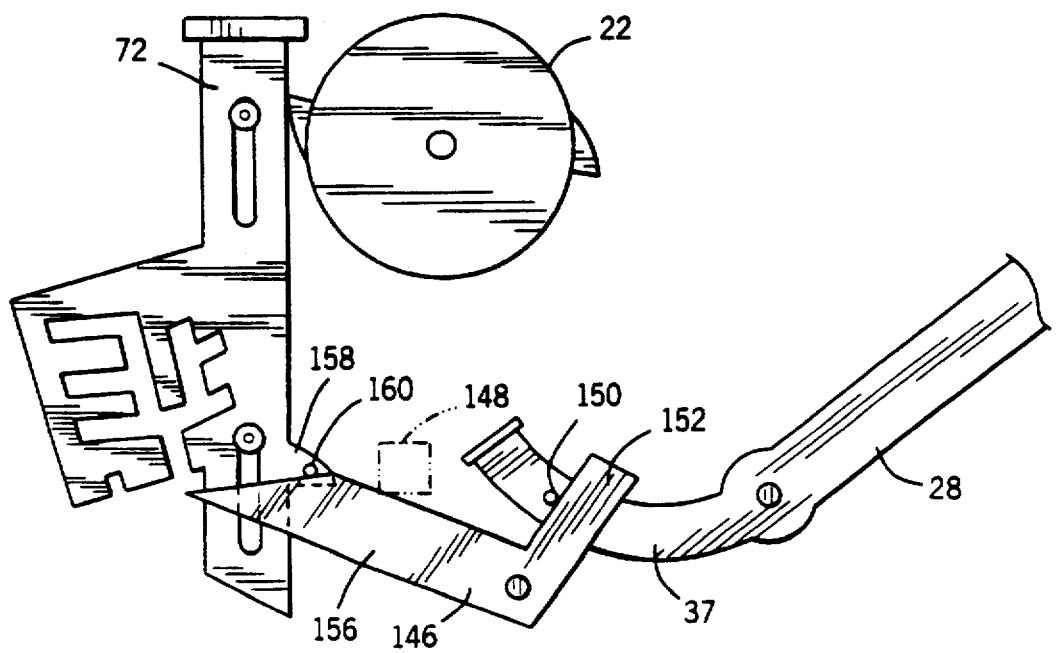

As shown in FIG. 10, the flag lever 146 may be reset by the reset lever 72, which includes an ear 158 having a pin 160 engaging the upper portion of the flag portion 156 of the flag lever 146. Movement of the reset slide 72 rotates the flag lever 146 in a counterclockwise direction moving the flag portion 156 away from the window 148. Again, the over center spring (not shown) holds the flag lever 146 in this position even after the reset slide 72 is retracted.

The free preview period defines a period during which no charge is made for playing the cassette 10 (and in fact there need be no indication that it has been played) and the cassette may be rewound and returned.

After the Replay Limit

Figure 3:
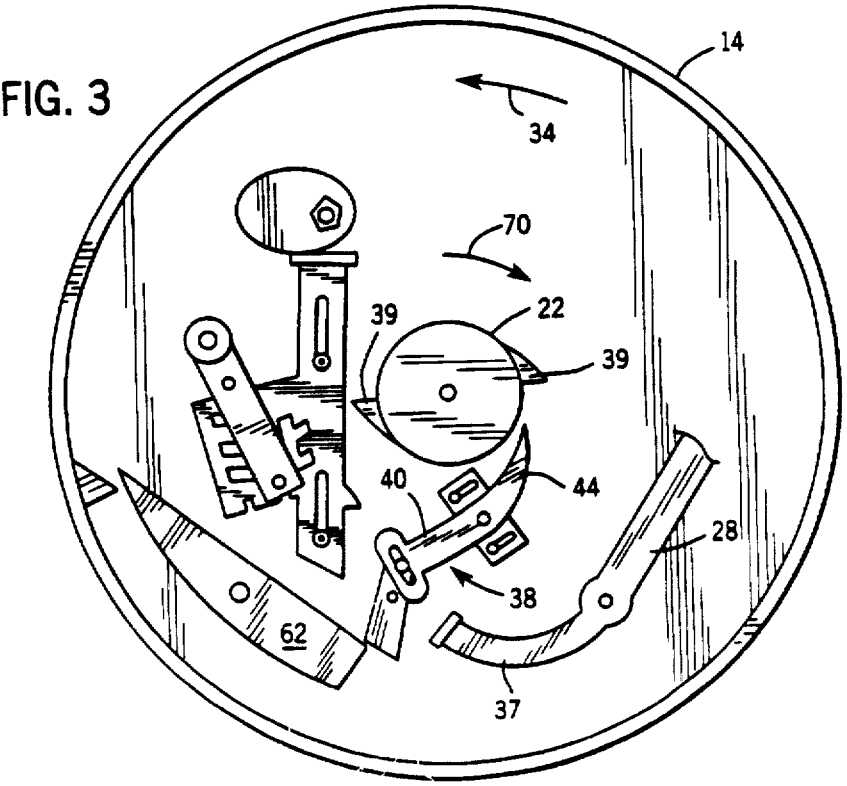
FIG. 3 is a view, similar to that of FIG. 2, but with the springs of the mechanism removed for clarity, and showing the mechanism after the cassette has been played for a period of time longer than the free preview period.

Referring now to FIG. 3, once the replay limit has passed, the tape follower arm 28 will have rotated counterclockwise to a position sufficient such that the finger 37 no longer supports the lever portion 40 of the reverse pawl 38 against the force of spring 50 (shown in FIG. 2), and the toothed portion 44 of the reverse pawl 38 may engage the ratchet teeth 39 on hub 22. As the oblique surface of each ratchet tooth 39 strikes the inside surface of the toothed portion 44 of the reverse pawl 38, the reverse pawl 38 rotates slightly in a clockwise direction against the force of spring 50 (shown in FIG. 2) about sliding hinge 52. Thus, as with a conventional ratchet, the interaction of ratchet teeth 39 and reverse pawl 38 is such as to permit free rotation in only one direction, in this case play direction 34, and engage only in the rewind direction 70, as will be described. At this point, the single-play feature of the cassette 10 is activated.

Referring now to FIG. 4, at any time after the beginning of the single-play period, the cassette 10 and tape 18 may be rewound as indicated by arrow 70. Upon rewinding of the cassette 10, the forward surface of one of the ratchet teeth 39 catches the toothed portion 44 of the reverse pawl 38, moving the entire reverse pawl 38 in a generally clockwise or leftward direction against the action of springs 48 (shown in FIG. 2), as accommodated by movement of the slide block 46. This motion of the reverse pawl 38 pushes the lever portion 40 against the radially inward or proximate end of release lever 54, through the sliding hinge 52, rotating the release lever 54 in a counterclockwise direction.

The outer end of release lever 54, previously supporting the lever portion 60 of the play pawl 62, is now disengaged from the lever portion 60, permitting the play pawl 62 to rotate in a counterclockwise direction, so that its toothed portion 67 moves radially outward with respect to the hub 22 to engage the ratchet teeth 68. Despite this engagement, however, the play pawl 62 does not obstruct the rewinding 70 of the cassette, but simply rotates in a clockwise direction, to move its toothed portion 67 away from the ratchet teeth 68, when the oblique surface of the ratchet teeth 68 touch the toothed portion 67 of the play pawl 62, as in conventional ratchet action.

However, when the tape is again moved in the play direction 34, the interaction of the ratchet 68 and the toothed portion 67 of the play pawl 62 will serve to prevent rotation in the play direction 34, and thus serves to prevent second viewings of the program material on the tape 18 after the free preview period has expired.

After the rewinding of the cassette 10, after the start of the single-play period, the toothed portion 44 of the reverse pawl 38 is held away from the ratchet teeth 39 by the release lever 54, which has released the lever portion 60 of the play pawl 62.

The lever portion 60 slips upward because of the urging of spring 66 (shown in FIG. 2) to prevent clockwise motion of the release lever 54 which in turn prevents re-engagement of the toothed portion 44 of the reverse pawl 38. Thus, after the predetermined replay limit has passed, the tape cassette 10 may be rewound, but not played again, until the mechanism is again reset to the configuration shown in FIG. 2.

Resetting the Cassette

Referring now to FIG. 5, the resetting of the tape cassette 10, after the single-play period, is accomplished by means of a reset slide 72. The reset slide 72 is guided by pins 74, so that it may slide from its retracted upward position, to push the lever end 60 of the play pawl 62 downward and clockwise, raising the toothed portion 67 of the play pawl 62 away from the ratchet teeth 68. When the play pawl 62 is so moved, in a clockwise direction, the radially outward end of the release lever 54 may slip back to the top of the lever portion 60 of the play pawl 62, under the urgings of the spring 58 (shown in FIG. 2). The reverse pawl 38 will have previously moved in a clockwise direction under the urging of the finger 37 of the tape follower arm 28, the follower arm having returned to its initial more clockwise direction as a result of the rewinding of the magnetic tape 18. Thus, after the magnetic tape 18 is rewound completely, the reset slide 72 may move to reset the mechanism of the tape cassette 10 to permit free playing and rewinding, prior to the replay limit, as before.

The reset slide 72 is moved by means of cam 76, positioned to abut the upper end of the reset slide 72, which rotates about a socket 78 accessible from outside of the housing 12. The simple resetting of the play pawl 62 by rotating socket 78 to move the reset slide 72, however, would provide insufficient security against resetting of the tape by unauthorized individuals. This is true even though the socket 78 is given a cross section whose outline is an irregular polygon, which prevents its engagement with common hex headed wrenches and the like.

Accordingly, a maze 80, having a serpentine channel 82 cut into a plate affixed to the reset slide 72, is attached to the reset slide 72 to move with movement of the reset slide 72. A locking pin 84 received by the serpentine channel 82 is supported by a locking lever 86, pivoting about pivot 88, to be navigated therethrough. The locking pin lever 86, on the opposite side of the pivot from the locking pin 84, supports an electromagnet 90 that communicates with a second electromagnet outside of the cassette housing 12 to permit movement of the locking pin lever 86 as the reset slide 72 is advanced, without breaching the integrity of the housing 12. The locking pin lever 86 moves generally in a radial path parallel to the "top" face 27 of the cassette housing 12.

It will now be understood that movement of the reset slide 72 requires rotation of the locking pin lever 86 so as to guide the locking pin 88 through the serpentine channel 82, during the movement of the reset slide 72 and the maze 80. The serpentine channel 82 includes dead-ends or "blind alleys" rendering this negotiation of the locking pin 84 through the serpentine channel 82 extremely difficult.

After the resetting is complete, by extension of the reset slide 72 sufficiently to move the play pawl 62 away from the ratchet teeth 68, the reset slide 72 is retracted, with the reverse sequence of movement of the locking pin 84 in the maze 80, so that the reset slide 72 does not interfere with the action of the play pawl 62 in restricting a second viewing of the tape cassette 10 after the replay limit is next exhausted.

Once the reset slide 72 is withdrawn upward, the locking pin 84 is allowed to return under the influence of its biasing spring so that the locking pin 84 aligns with notch 87 in a strong locking position which prevents the motion of reset slide 72 downward and establishes the position of electromagnet 90 so that it may be subsequently located.

Multiple Replay Mechanism

Figure 11:
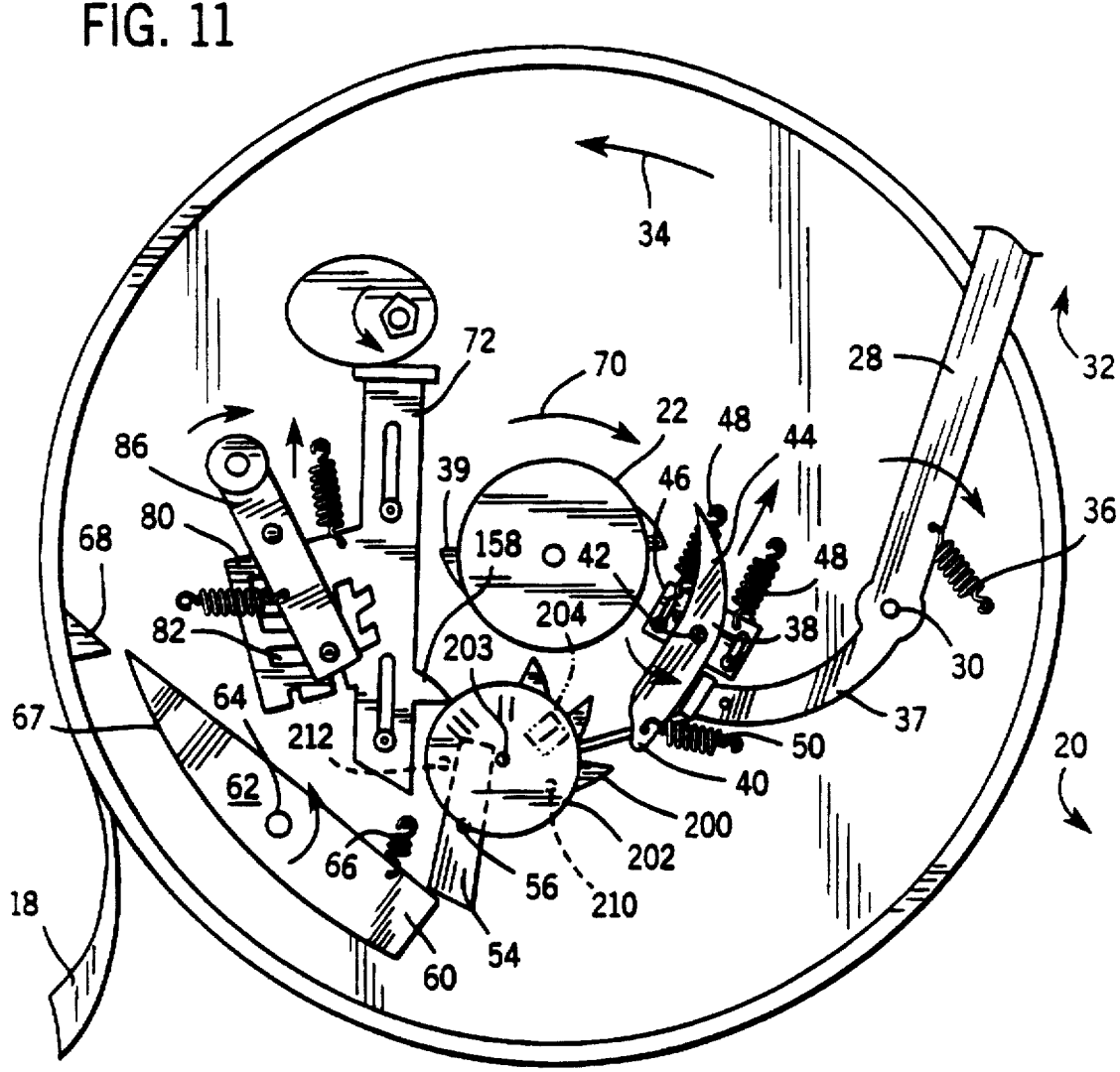
FIG. 11 is a figure similar to that of FIG. 3 showing a second embodiment of the mechanism having a counter wheel permitting three plays of the cassette prior to locking.

Referring to FIG. 11, the previously described mechanism may be simply modified to permit multiple replays of the cassette 10 prior to locking the cassette 10 against further playing. In this embodiment, the reverse pawl 38 is modified and no longer connects directly to the release lever 54. Instead, when the finger 37 allows the toothed portion 44 of the reverse pawl 38 to engage the ratchet teeth 39, the lever portion 40 of the reverse pawl 38 strikes a ratchet tooth 200 on a counter wheel 202 advancing the counter wheel 202 in a clockwise direction by a half step. The counter wheel 202 pivots about a pivot point 203 and has embossed on its upper surface a machine readable coding consisting of one, two or three bars corresponding roughly to the Roman numerals I, II and III. At each full step, a different embossment is visible through a window 204 and may be read as will be described below.

The counter wheel 202 initially displays the single line embossment "I" through the window 204 and with the striking of the lever portion 40 of the reverse pawl 38 against the ratchet tooth 200, the toothed wheel 202 moves such that the window 204 displays a portion of the toothed wheel 202 between two of the embossments.

Figure 12:
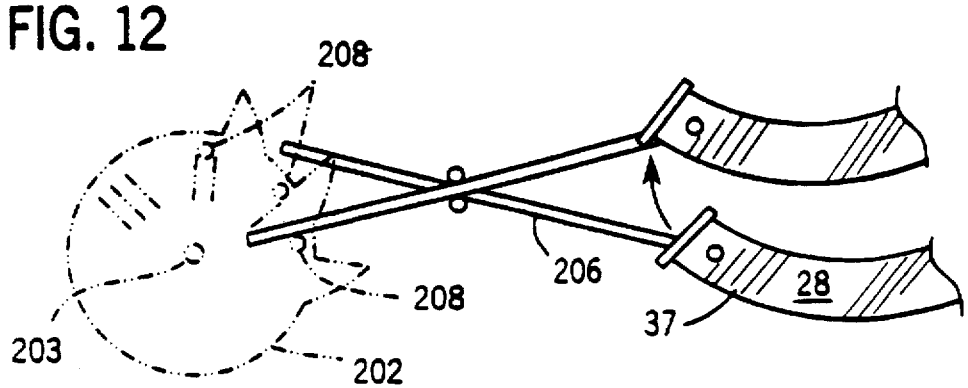
FIG. 12 is a detailed view of the counting wheel of FIG. 11 showing the advancing of the counter wheel during the rewinding of the cassette.

Referring to FIG. 12, as the arm 28 returns to its initial position with a rewinding of the tape and finger 37 moves towards the hub 22, a pawl arm 206 engages one of downwardly extending pins 208 on the counter wheel 202 so as to advance the counter wheel 202 by a second half step while simultaneously disengaging reverse pawl 38 from the ratchet teeth 39 of the hub 22. Thus, for each play of the cassette, the counter wheel 202 advances by one step.

At the conclusion of three steps of advancements of the counter wheel 202, a trip pin 210 downwardly extending from the bottom surface of the counter wheel 202 strikes the release lever 54 releasing the play pawl 62 as has been previously described thus preventing a further playing of the cassette 10.

The counter wheel 202 may be reset, bringing about the resetting of the release lever 54 and the play pawl 62 as has been previously described, by means of the ear 158 on the reset lever 72 engaging a reset pin 212 also downwardly extending from the lower surface of the counter wheel 202 which returns the counter wheel 202 to its reset and counter clockwise position.

The Resetting Unit

Figure 6:
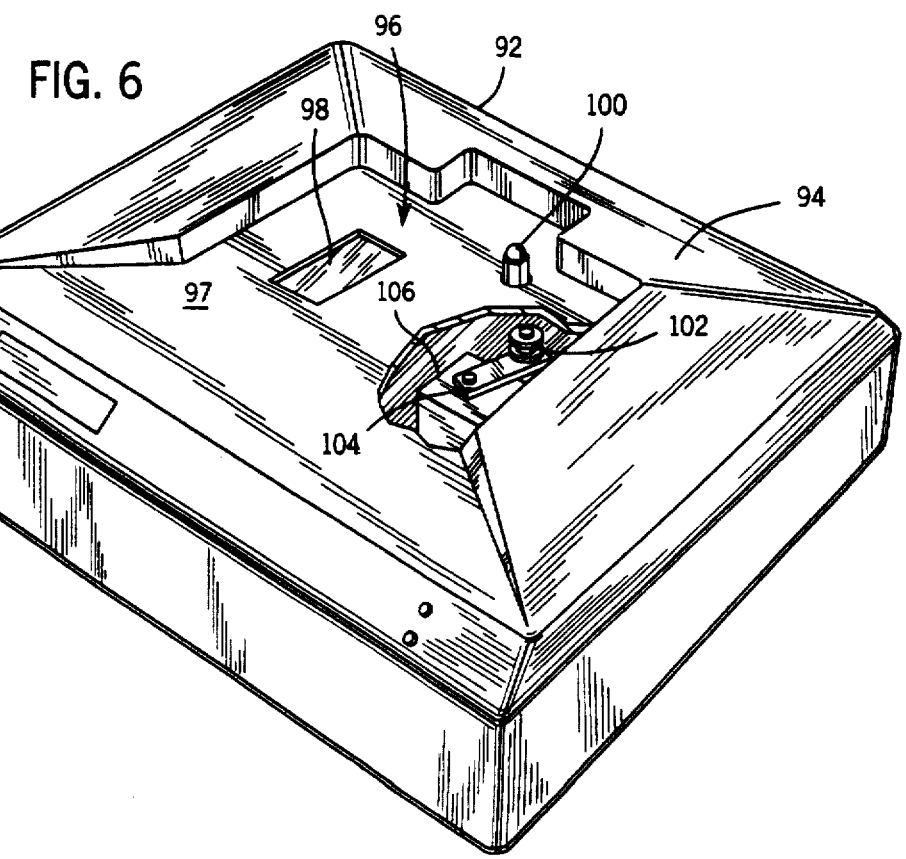
FIG. 6 is a perspective view of the resetting mechanism cut away to show a concealed electromagnet used for resetting the cassette mechanism of FIG. 2.

The resetting of the cassette 10 by rotation of the cam 76, and careful movement of the locking pin lever 86, cannot be readily performed by hand. Rather, referring to FIGS. 6 and 7, a resetting unit 92 is employed.

The resetting unit 92 has a housing 94 including a cavity 96 of outline similar to the housing 12 of the tape cassette 10 for receiving the tape cassette 10 therein so that the top face 27 of the tape cassette 10 abuts a bottom wall 97. Within the bottom wall 97 of the cavity 96 is a window 98 and vertically protruding reset wrench 100, having a cross-section conforming to the previously described socket 78 attached to the cam 76. Positioned beneath the bottom wall 97 of the cavity 96 is an electromagnet 102 supported by arm 104 on stepper motor 106, to move in a radial path parallel to but just beneath the wall 97.

The cassette 10 is placed in the cavity 96, so that the reset wrench 100 is received by the socket 78, and so that the radial path of electromagnet 102 corresponds with the radial path of electromagnet 90 on the locking pin lever 86. When the cassette is in position in the cavity 96, the window 98 aligns with a bar code on a label positioned on the outside of the housing 12 of the tape cassette 10 permitting a bar code reader 110, positioned beneath the bottom wall 97 within the resetting unit 92, to read the bar code 108. A count reader 111 aligns with the window 204 of the cassette 10 to permit the number of plays of the cassette to be read from the count wheel 202. Although the present invention contemplates that the bar code reader 110 and the counter reader 111 are optical systems reading bar codes, it will be understood that other reading systems may be used and that the term label should be considered to embrace other means of communicating the necessary information including, for example low powered radio frequency resonators (RF tags) and the like.

Power is provided to electromagnet 90 from the resetting unit 92 by means of a center conductor 118 within the reset wrench 100 and the outer conducting body of the reset wrench 100 which provides a ground path. The reset wrench 100 is also connected to a cam stepper motor unit 122 which serves to rotate the reset wrench 100.

The bar code reader 110, the locking pin stepper motor unit 106 and the cam stepper motor unit 122 are each connected to a microprocessor unit 124 for the reading of data from and the control of these units as will be understood to those of ordinary skill in the art.

The microprocessor 124 in turn communicates with a number of memory devices including electronically erasable programmable read only memory 126 ("EEPROM"), random access memory 128 ("RAM"), read only memory 130 ("ROM") and a write once read mostly memory 132 ("WORM") in the form of a removable medium optical disc.

Figure 8:
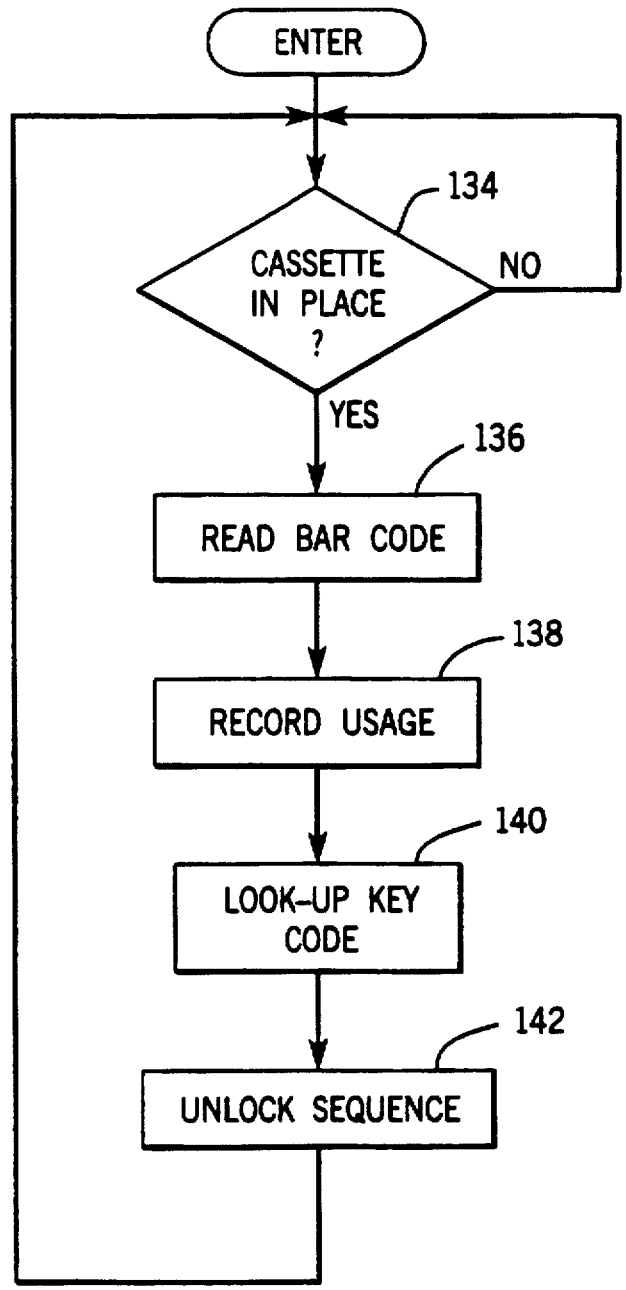
FIG. 8 is a flow chart illustrating the operation of the resetting mechanism and in particular the tying of the resetting of the casette to the recording of the cassette identification information.

Referring now also to FIG. 8, the microprocessor 124 executes a program contained in ROM 130. At decision block 134 of that program, the microprocessor 124 determines whether a cassette 10 is in place within cavity 96 of the resetting unit 92. This determination is made by measuring the current flow from the reset wrench 100 through the electromagnet 90. This determination also insures that electromagnet 90 is functioning.

If no cassette is in place, determined as indicated at decision block 134, the program loops through decision block 134 until a cassette 10 is in place.

If a cassette is in place at decision block 134, then at process block 136, the bar code reader 110 reads the bar code 108 on the outside of the housing 12 to establish both the identity of the recorded material and a key code indicating the particular maze 80 employed with that cassette.

After the identity of the recorded material is determined, data indicating a viewing of the material of the cassette 10 and relevant information identifying the cassette 10 are stored on WORM 132. Audit data indicating for example simply the fact of a single resetting is stored in the EEPROM 126 as indicated by block 138. This audit data provides data for checking the information stored on the WORM 132 which is used for generating more detailed bills based on usage of the cassette 10. The number of plays indicated by the count wheel 202 may also be recorded. This information may be used to provide a more accurate charging of the user for actual plays but it is anticipated will instead be used to track usage of the cassette for its value as marketing information. The audit data may likewise include general checksums of the information contained on the WORM 132.

At process block 140, ROM 130 is interrogated to obtain the sequence of moves of the cam 76 based on the bar code 108 read by the bar code reader 110 and the locking pin lever 86 corresponding to the key code indicated on the bar code 108 and necessary to reset the tape cassette 10 by moving cam 76 and locking pin lever 86. Although the sequence of moves corresponding to the key code may be simply stored or programmed into the ROM 130, preferably, the ROM 130 provides only a decoding sequence used to decode key codes embedded in coded form in the bar code 108. The decoded key codes are used to access a sequence of moves of the cam 76 as stored in the WORM 132. The use of ROM 130 provides an increased element of security against the unauthorized resetting of the cassettes 10, for example, by unauthorized resetting units. It will be understood to those of ordinary skill in the art that the ROM may be replaced by other readily available and equivalent electrical devices such as: programmable read only memories, erasable programmable read only memories, and even devices not strictly classified as memories such a programmable gate arrays. All such devices resist casual efforts to copy them and thus improve the security of the system and serve to match particular reset codes to corresponding key codes.

Each rental outlet is provided with bar codes 108 on its cassettes 10 that are unique to that outlet. Although the software of a particular resetting unit 92 may be relatively easily copied, the ROM 130 may be embedded in a microprocessor, for example, and thus substantially immune to copying. Thus the cassettes 10 of a particular retail outlet cannot be reset by unauthorized equipment, either legitimate resetting units 92 originally associated with other outlets or reverse engineered resetting units.

Referring to FIG. 13, in the case where the reset codes of the bar code provides key codes having no relationship to the desired sequence of moves for unlocking the cassette. A given ROM 130 will only recognize a limited number of the available key codes. In the case where ROM 130 provides decoding information to decode the key codes into actual sequences of moves, the decoding information will only operate with a limited number of the available codes. Thus when one attempts to reset a cassette from another store, the ROM 130 will be unable to provide the necessary conversion of the key code into a sequence of moves.

The significance of this coding structure, made possible by the construction of the present invention, is that an unauthorized machine based on the present design, or a stolen machine will only be able to reset a small portion of the circulating cassettes. Thus, the incentive to construct or acquire such a machine without authorization is greatly reduced. Further, in instances where there are multiple rental outlets serving given consumers, the possibility of similar cassettes being returned to and reset by the wrong machine with the attendant accounting problems is significantly reduced.

It is noted that even though the reset codes for cassettes 10 associated with different resetting machines 92 are different, the actual key codes to which they are translated may be the same. Thus the number of different lock mechanisms required is not unduly multiplied.

At process block 142, the unlocking sequence is started by first moving cam stepper motor 122 in a fully clockwise position against a stop (not shown) where the cam lobe is furthest from the reset slide. Referring now to FIGS. 5, 7 and 8, as the cam 76 is rotated by cam stepper motor unit 122 under control of microprocessor 124, the locking pin lever 86 is moved by stepper motor unit 106 (through electromagnet 102 and the electromagnet 90) to negotiate the locking pin 84 through the serpentine path 82 of the particular maze 80 associated with that tape cassette 10. Different cassettes 10 have different maze patterns.

With the cam 76 rotated to fully depress the reset slide 72, the mechanism of play pawl 62, release lever 54 and reverse pawl 38 is fully reset. At this point, the sequence indicated by the bar code 108 is employed in reverse order to fully retract reset slide 72 by rotation of cam 76 and movement of locking pin 84.

It will be understood then from this description that the resetting unit 92 simultaneously solves the problem of executing the complex sequence required to reset the tape cassette 10, while insuring an accurate auditing of the play of each cassette 10. The data represented by the bar code 108 provides identification of the program material and the proper unlocking code thereby insuring the integrity of the audit data as to each time cassette 10 is reset.

Periodically, the WORM 132 may be shipped to the cassette supplier to provide billing information. Alternatively, the WORM 132 may be interrogated via modem (not shown) over the telephone lines. In this case the access to the WORM 132 must be controlled and such control is enforced by requiring the party reading or writing to the WORM 132 to present an access code that is compared to a similar code held in EEPROM 126. For added security, if the codes do not match, the EEPROM may be destroyed under software control to prevent repeated trials of access codes.

Many modifications and variations of the preferred embodiment which will still be within the spirit and scope of the invention will be apparent to those of ordinary skill in the art. For example, the electromagnet linkage 102 and 90 may be replaced by a direct linkage through a slot with a corresponding marginal loss in the cassette's resistance to tampering. In addition the maze element could be three dimensional. In order to apprise the public of the various embodiments that may fall within the scope of the invention, the following claims are made.

We claim:

1. In a cassette holding a supply reel and a take-up reel, the supply reel being fully wound with magnetic tape in a starting state, the cassette permitting movement of the magnetic tape from the supply reel to the take-up reel when playing and permitting movement of the magnetic tape from the take-up reel to the supply reel when rewinding, an improvement comprising:

a disabling means for preventing the playing when set and allowing the playing when reset; and a reset means for moving to reset the disabling means;

a lock mechanism for preventing movement of the reset means when locked and hence an unauthorized resetting of the cassette; the lock mechanism further including:

a pin;

a maze attached to the reset means and having a serpentine channel for receiving the pin for allowing movement of the reset means only when the pin is successfully navigated through the maze; and a linkage attached to the pin for moving the pin and the reset means to navigate the pin through the maze to permit resetting of the disabling means.

2. The cassette as recited in claim 1 wherein the linkage includes a first pivoting arm holding the pin within the cassette, the first pivoting arm being magnetically linked to a second pivoting arm outside of the cassette.

3. In a cassette holding a supply reel and a take-up reel, the supply reel being fully wound with magnetic tape in a starting state, the cassette permitting movement of the magnetic tape from the supply reel to the take-up reel when playing an permitting movement of the magnetic tape from the take-up reel to the supply reel when rewinding, an improvement comprising:

a disabling means for preventing the playing but allowing the rewinding when set and allowing both the playing and the rewinding when reset; and a counter for producing a machine readable count value indicating the number of replays of the cassette and for setting the disabling means when the count value exceeds a predetermined count limit greater than one replay;

a reset means for moving to reset the disabling means and the counter;

a lock mechanism for preventing movement of the reset means when locked and hence an unauthorized resetting of the cassette, the lock mechanism further including:

a pin;

a maze attached to the reset means and having a serpentine channel for receiving the pin for allowing movement of the reset means only when the pin is successfully navigated through the maze; and a linkage attached to the pin for moving the pin and the reset means to navigate the pin through the maze to permit resetting of the disabling means.

4. The cassette as recited in claim 3 wherein the linkage includes a first pivoting arm holding the pin within the cassette, the first pivoting arm being magnetically linked to a second pivoting arm outside of the cassette.

5. The cassette as recited in claim 3 wherein the predetermined number is less than ten.

* * * * *